(12) United States Patent
Avital et al.

(10) Patent No.: US 8,923,258 B2
(45) Date of Patent: Dec. 30, 2014

(54) TECHNIQUES FOR AUTONOMOUS WIRELESS NETWORK INFRASTRUCTURE ASSISTED LOCATION RESOLUTION

(75) Inventors: Shlomo Avital, Jerusalem (IL); Miri Ratner, Ramat Gan (IL)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 12/945,140

(22) Filed: Nov. 12, 2010

(65) Prior Publication Data

US 2012/0120929 A1 May 17, 2012

(51) Int. Cl.
*H04W 4/02* (2009.01)

(52) U.S. Cl.
CPC .................................... *H04W 4/023* (2013.01)
USPC ........................................ 370/338; 455/456.1

(58) Field of Classification Search
CPC ..... H04W 4/021; H04W 4/023; H04W 4/025; H04W 64/00; H04W 64/003
USPC .............................. 370/338; 455/456.1–456.6
See application file for complete search history.

(56) References Cited

U.S. PATENT DOCUMENTS

| | | | |
|---|---|---|---|
| 7,831,216 B1* | 11/2010 | Yenney et al. | 455/88 |
| 7,881,263 B1* | 2/2011 | Vargantwar et al. | 370/331 |
| 8,370,629 B1* | 2/2013 | Ngo et al. | 713/168 |
| 2004/0246934 A1 | 12/2004 | Kim | |
| 2006/0045056 A1 | 3/2006 | O'Hara | |
| 2009/0088183 A1 | 4/2009 | Piersol et al. | |
| 2009/0257376 A1 | 10/2009 | Dhanapal et al. | |
| 2010/0004997 A1* | 1/2010 | Mehta et al. | 705/14.66 |
| 2010/0015999 A1* | 1/2010 | Belz et al. | 455/456.2 |
| 2011/0176523 A1* | 7/2011 | Huang et al. | 370/338 |
| 2012/0002980 A1* | 1/2012 | Tse et al. | 399/8 |
| 2012/0021759 A1* | 1/2012 | Chen et al. | 455/456.1 |
| 2012/0039316 A1* | 2/2012 | Park et al. | 370/338 |

OTHER PUBLICATIONS

International Search Report and Written Opinion Received for PCT Application No. PCT/US2011/060233, mailed on Mar. 28, 2012, 9 pages.

* cited by examiner

*Primary Examiner* — Paul H Masur
(74) *Attorney, Agent, or Firm* — Ellis B. Ramirez; Prass LLP

(57) ABSTRACT

An embodiment of the present invention provides a method to resolve a location of nodes operating in a wireless network, comprising using a wireless network infrastructure of the wireless network to determine the location of the nodes by each location aware node distributing location information within the wireless network such that each node may learn its location directly from the infrastructure of the network.

9 Claims, 2 Drawing Sheets

TECHNIQUES FOR AUTONOMOUS WIRELESS NETWORK INFRASTRUCTURE ASSISTED LOCATION RESOLUTION

BACKGROUND

Retrieving location information by nodes operating in wireless networks, such as but not limited to, those operating in conformance with the Institute for Electronic and Electrical Engineering (IEEE) 802.11 standard (which may also be referred to herein as a Wi-Fi network), have become common practice. However, current methods use a centralized data base on the network to retrieve the location, some other methods may cache segments of the central data base on the mobile device itself. The centralized data base approach has many disadvantages, such as: It is complicated and costly to build such a data base; using it is associated with registration and payment; the centralized data base approach does not resolve mobile access points (APs) location; and the data collection is usually built by sending vehicles with WiFi sniffers and such methods cannot detect APs in higher floors or inner building locations.

Thus, a critical need is prevalent for improvements in node location determination in wireless networks, such as 802.11 wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
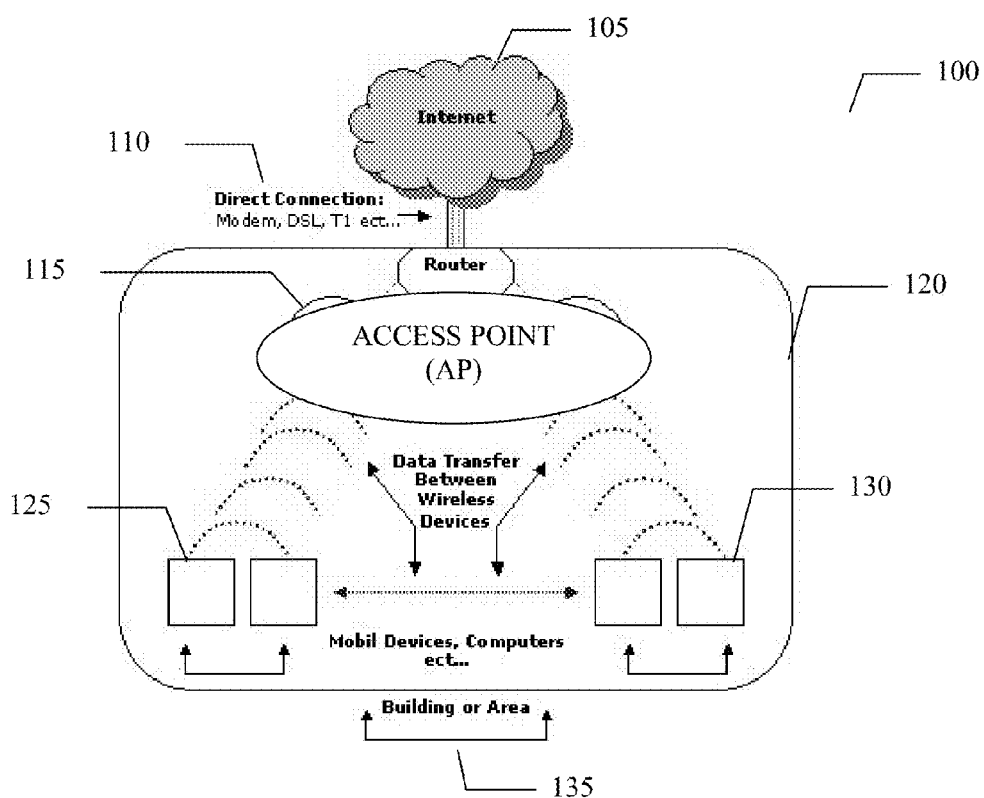
FIG. 1 illustrates a block diagram of an illustrative wireless network according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide techniques to resolve location determination using wireless networks (such as but not limited to those that conform to the IEEE 802.11 standard, also referred to herein as a WiFi) without using a centralized data base. Specifically, updated location information may propagate seamlessly within the wireless network, without any user intervention. Conceptually, this is a new service as the WiFi network and devices autonomously learn and exchange location information, and may further transfer this information to higher level applications, peripherals, other communication devices etc.

Increasingly devices are running location aware applications and more and more devices are equipped with both WiFi and global positioning systems (GPS)—specifically cellphones, but also tablets and netbooks, just to name a few. Further, the concept of internetwork information-sharing and knowledge collaboration has become increasingly popular. In indoor environments it is difficult to get GPS lock and indoor locations can be provided using other technologies like wifi, or using Assisted GPS techniques.

Thus, embodiments of the present invention provide methods and algorithms enabling retrieval and updating of location information using the WiFi infrastructure without a need for centralized data base. Each location aware node (such as, but not limited to a mobile device (STA) or access point (AP)) may distribute location information within a WiFi network, and each node may learn its location directly from the network. The network location information is constantly updated and may be propagated constantly, hence enabling mobile network support.

Turning now to the figures, FIG. 1 at 100 depicts an embodiment of the present invention which provides an apparatus and system, comprising a transceiver associated with a mobile device (125 or 130), which may be referred to as a wireless station (STA) operable to communicate in a wireless network 140 that may be located in a specific area or building 135. The mobile devices may be in communication with access point 115 with an associated transceiver, which may be connected to the Internet 105 via, for example, a T-1 line or fiber optic line 110. The AP and STAs may be operating as part of the same basic service set (BSS) 120. The transceivers associated with the AP and STA may operate according to the techniques outlined above and according to the method described below.

Figure 2:
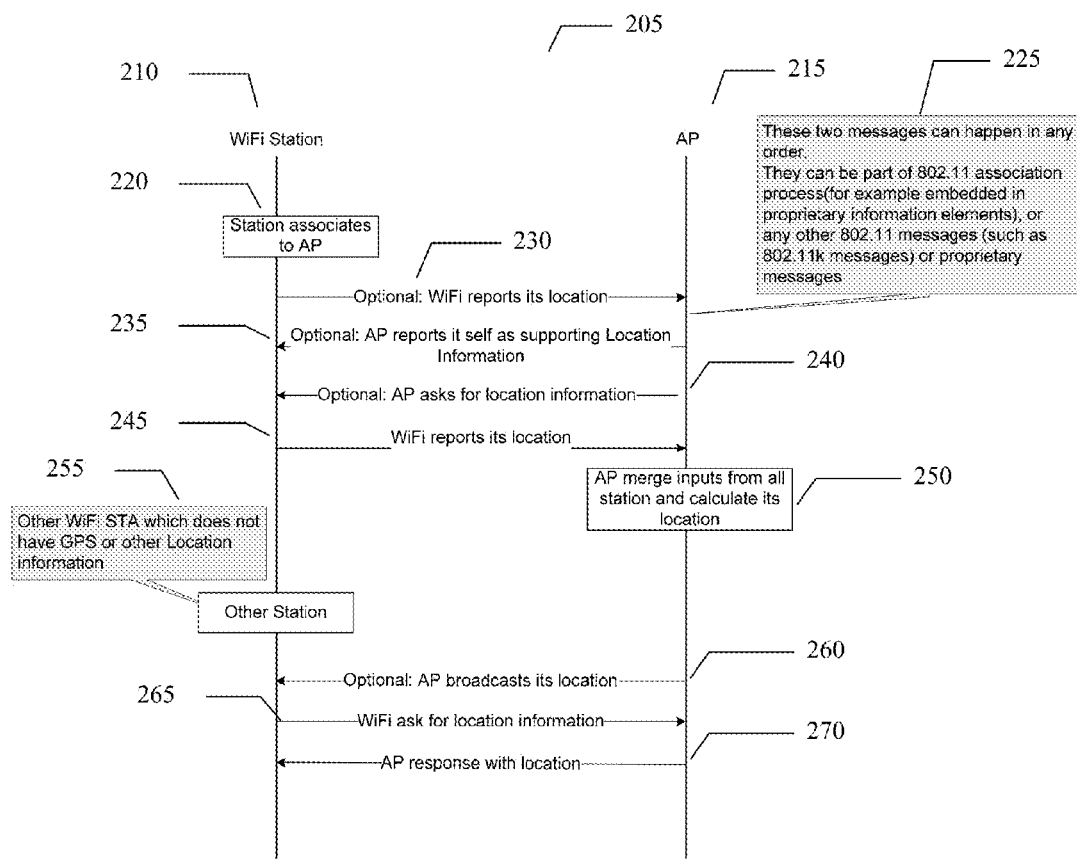
FIG. 2 provides a flow chart depicting methods enabling techniques for autonomous wireless network infrastructure assisted location resolution according to embodiments of the present invention.

Looking now at FIG. 2, generally as 205, is a flowchart depicting methods according to embodiments of the present invention and depict wireless mobile station (STA) 210 and AP 215. As an optional embodiment of the present invention, when a STA which knows its location (for example, but not limited to, a smartphone with GPS) and associates 220 to an access point (AP) 215, it might report 230 its location to the AP 215. Alternatively, the STA 210 may report itself as "location aware" 235, and then the AP can query 240 the location from the device. As indicated by callout 225 messages 230 and 235 can happen in any order. After the query at 240, STA may report its location at 245. This handshake can be done using proprietary Information elements in the WiFi association packets, or as separate messages.

The AP may process location information from different stations and calculate its location as shown at 250. Other stations which don't have locations set, can query at 255 the AP for location information. It is noted that the AP might be also a Soft AP and the AP might also retrieve its location from other sources. (for example, but not limited to, an IP network or set manually, etc.). Further, a WiFi Station that queries for location can use it for different location application, or as assisted data for a GPS capable device.

In order to resolve its location STA at 265 may ask for location information. At 270 the AP may respond with location information. Another optional method to resolve location is at 260 wherein the AP may broadcast its location periodically.

Thus, embodiments of the present invention may provide an apparatus, comprising a node operable in a wireless network and adapted to resolve its location using a wireless network infrastructure of said wireless network to determine said location of said node by each location aware node distributing location information within said wireless network such that each node may learn its location directly from said infrastructure of said network.

Embodiments of the present invention may further provide a computer readable medium encoded with computer executable instructions, which when accessed, cause a machine to perform operations comprising resolving a location of nodes operating in a wireless network using a wireless network infrastructure of said wireless network to determine said location of said nodes by each location aware node distributing location information within said wireless network such that each node may learn its location directly from said infrastructure of said network.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method to resolve a location of nodes operating in a wireless network, comprising:
   using a wireless network infrastructure of said wireless network to determine said location of said nodes by each location aware node distributing location information within said wireless network such that each node may learn location information directly from said infrastructure of said wireless network;
   if a node is an access point (AP) operating in said wireless network and said AP determines location information by receiving location information from a location determination capable wireless station in communication with said AP operating within said wireless network;
   if said location determination capable wireless station reports as being location aware then said AP may query location information from said location determination capable wireless station via a handshake accomplished using a proprietary information element (IE) in association packets or as separate messages;
   if said location determination capable wireless station determines location information for said location determination capable wireless station then said location determination capable wireless station reports the determined location information to said AP;
   wherein said AP can process location information from a plurality of location determination capable wireless stations to determine said AP location;
   wherein when a STA operating within said wireless network is incapable of determining location information the STA may derive the location information from an AP response or an AP broadcast of location information.

2. The method of claim 1, wherein a network location information is updated by nodes operating in said wireless network and propagated constantly by said network infrastructure.

3. The method of claim 1, wherein said wireless network operates conforming to the Institute for Electronic and Electrical Engineering (IEEE) 802.11 standard.

4. A non-transitory computer readable medium encoded with computer executable instructions, which when accessed, cause a machine to perform operations comprising:
   resolving a location of nodes operating in a wireless network using a wireless network infrastructure of said wireless network to determine said location of said nodes by each location aware node distributing location information within said wireless network such that each node may learn location information directly from said infrastructure of said wireless network;
   if a node is an access point (AP) operating in said wireless network and said AP determines location information by receiving location information from a location determination capable wireless station in communication with said AP operating within said wireless network;
   if said location determination capable wireless station reports as being location aware then said AP may query location information from said location determination capable wireless station via a handshake accomplished using a proprietary information element (IE) in association packets or as separate messages;
   if said location determination capable wireless station determines location information for said location determination capable wireless station then said location determination capable wireless station reports the determined location information to said AP;
   wherein said AP can process location information from a plurality of location determination capable wireless stations to determine said AP location;
   wherein when a STA operating within said wireless network is incapable of determining location information the STA may derive the location information from an AP response or an AP broadcast of location information.

5. The non-transitory computer readable medium encoded with computer executable instructions of claim 4, wherein a network location information is updated by nodes operating in said wireless network and propagated constantly by said network infrastructure.

6. The non-transitory computer readable medium encoded with computer executable instructions of claim 4, wherein said wireless network operates conforming to the Institute for Electronic and Electrical Engineering (IEEE) 802.11 standard.

7. An apparatus, comprising:
   a node operable in a wireless network and adapted to resolve its location using a wireless network infrastructure of said wireless network to determine said location of said node by each location aware node distributing location information within said wireless network such that each node may learn location information directly from said infrastructure of said wireless network;
   if a node is an access point (AP) operating in said wireless network and said AP determines location information by receiving location information from a location determination capable wireless station in communication with said AP operating within said wireless network;

if said location determination capable wireless station reports as being location aware then said AP may query location information from said location determination capable wireless station via a handshake accomplished using a proprietary information element (IE) in association packets or as separate messages;

if said location determination capable wireless station determines location information for said location determination capable wireless station then said location determination capable wireless station reports the determined location information to said AP;

wherein said AP can process location information from a plurality of location determination capable wireless stations to determine said AP location;

wherein when a STA operating within said wireless network is incapable of determining location information the STA may derive the location information from an AP response or an AP broadcast of location information.

8. The apparatus of claim 7, wherein a network location information is updated by nodes operating in said wireless network and propagated constantly by said network infrastructure.

9. The apparatus of claim 7, wherein a node is an access point (AP) operating in said wireless network and wherein said AP determines location information by receiving location information from a location determination capable wireless station (STA) in communication with said access point and operating within said wireless network.

* * * * *